United States Patent
Kobayashi et al.

[15] 3,662,238
[45] May 9, 1972

[54] ELECTRONICALLY COMMUTATED MOTOR

[72] Inventors: Kazutsugu Kobayashi; Hisayuki Matsumoto; Yoshiaki Igarashi, all of Osaka, Japan

[73] Assignee: Matsushita Electric Industrial Co., Ltd.

[22] Filed: May 20, 1969

[21] Appl. No.: 826,191

[30] Foreign Application Priority Data

May 21, 1968 Japan..................................43/35220
May 22, 1968 Japan..................................43/35252

[52] U.S. Cl.............................................318/254, 318/439
[51] Int. Cl. ......................................................H02k 29/00
[58] Field of Search ...................................313/133, 254, 439

[56] References Cited

UNITED STATES PATENTS

| | | | |
|---|---|---|---|
| 3,517,289 | 6/1970 | Brunner et al. | 318/138 |
| 3,452,263 | 6/1969 | Newell | 318/138 |
| 3,483,456 | 12/1969 | Brunner et al. | 318/254 X |
| 3,274,471 | 9/1966 | Molzala | 318/138 |
| 3,448,359 | 6/1969 | Engel | 318/138 |
| 3,486,099 | 12/1969 | Brunner et al. | 318/254 |

Primary Examiner—G. R. Simmons
Attorney—Wenderoth, Lind & Ponack

[57] ABSTRACT

An electronically commutated motor and control means therefor.

The electronically commutated motor has no dead zone and no overlap despite an imperfect position detecting signal. The transition of the commutation is carried out in a differential manner. Any fluctuation in the operating temperature and/or deviation of the supply voltage does not disturb the commutation. The generating torque of the motor is easily controlled by a small power without using any additional power control means. A constant torque motor and a constant speed motor are illustrated.

5 Claims, 16 Drawing Figures

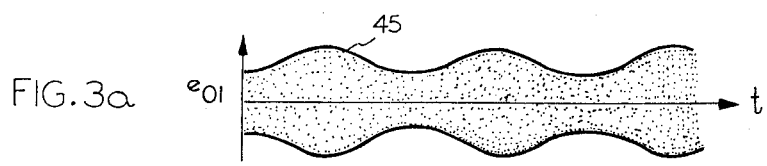
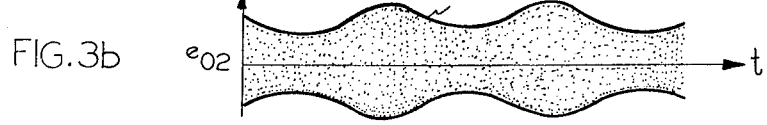
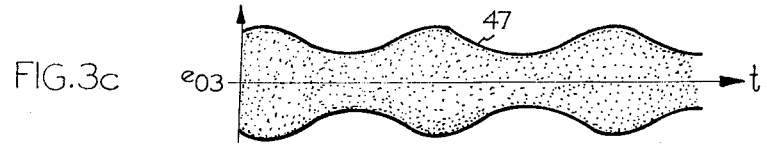
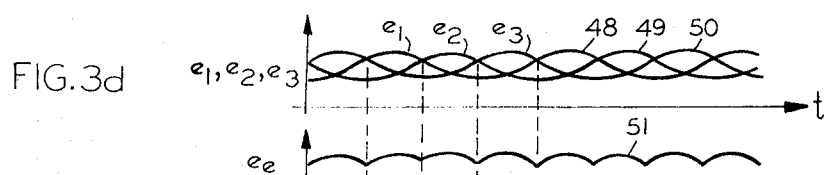
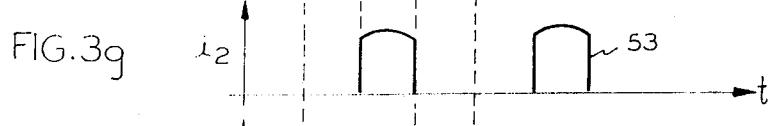
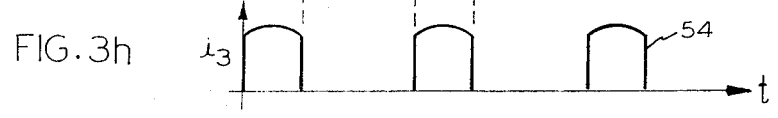
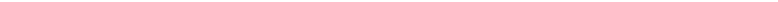

ELECTRONICALLY COMMUTATED MOTOR

This invention relates to improved electric motors, particularly to electronically commutated motors, and more particularly to those of the position detecting type.

A motor which is compact, selfstarting, which has a preselected direction of rotation, which has a smooth torque, and which is capable of operating on DC, is useful in electronic equipment for driving various movable components. Portable tape recorders, for example, require such motors which in addition have a substantially constant predetermined speed (as capstan motors) or a substantially constant predetermined torque (as reel motors). Up to this time many methods have been proposed relating to the commutation of electric current flowing through the armature winding, which methods ulitize electronic devices such as photosensitive elements cooperating with a light source and a rotating slit, magnetic sensitive devices in combination with a permanent magnet, and an impedance commutator utilizing a saturable reactor (U.S. Pat. No. 2,797,375) or the mutual coupling of two coils (U.S. Pats. Nos. 1,971,188 and 3,091,728) all operating on relatively high frequency alternating current.

Many deficiencies of mechanically commutated motors, such as relatively short life due to the wearing of brushes and the commutator material, generation of electric, electromagnetic and sonic noise due to the sparking and chattering between the brush and the commutator, and energy loss due to the friction between the brushes and the commutator material, are overcome by using any of the methods described above.

However, there do exist other difficulties in such brushless motors (hereinafter called electronically commutated motors). An electronically commutated motor employing photosensitive elements does not have a long life or a high efficiency because the light source usually has a relatively short life and poor efficiency of conversion of electronic energy to light energy. The most prominent feature of the optical system which utilizes photosensitive elements is that it is easy to give the commutation signal an on-off characteristic, or in other words, to provide a descrete signal level for on-off operation.

A discontinuous commutation signal is necessary for high efficiency. The magnetic system and the impedance system are preferable to the optical system from the stand point of their length of useful life, although the commutation signal obtained by those systems is not a discontinuous one.

The impedance system, which is very inexpensive as compared to the other systems, produces a commutation signal which has very poor discontinuity, especially where the system has a simple construction.

In addition to discontinuity, two important features of the commutation signal are as follows:

i. No dead zone should exist when changing from one phase signal to another phase signal. This will prevent incorrect starting.

ii. No overlap of one phase with another phase should exist. This will prevent small torque ripple and premote high efficiency.

These two conditions are very difficult to satisfy simultaneously with the feature of good discontinuity in a commutation signal produced in an optical system, and with the feature of poor discontinuity in a commutation signal produced in a magnetic system or an impedance system.

It is an object of the present invention to provide an improved electronically commutated motor.

It is a further object of the present invention to provide an electronically commutated motor having little torque ripple.

It is a still further object of the present invention to provide an electronically commutated motor which does not start improperly.

It is a still further object of the present invention to provide an electronically commutated motor which does not require too much precision in the manufacturing process.

It is a still further object of the present invention to provide a principle for the construction of a perfect commutation signal which can be utilized in any electronic commutating system.

The electronically commutated motor, according to the present invention, has a commutation signal with the above mentioned important features without the disadvantages inherent in the use of the optical system, the magnetic system or the impedance system.

It is a still further object of the present invention to provide a method for controlling torque generated by a motor by a relatively small power dissipating variable resistor, without losing any of the above-mentioned features.

It is a still further object of the present invention to provide a method for controlling the torque of a motor by a weak electric signal, without losing any of the above-mentioned features.

It is still a further object of the present invention to provide a method for controlling the torque of a motor driven from constant supply voltage, without losing any of the above-mentioned features.

It is a still further object of the present invention to provide a constant torque motor.

It is a still further object of the present invention to provide a motor which can be applied to a feedback control system without using any additional power amplifier.

It is a still further object of the present invention to provide a speed controlled motor.

Briefly described, the motor according to the present invention utilizes polyphase rectification by a base-emitter circuit of a transistor, and the common emitter impedance of the transistor is varied so as to control the generating torque of the motor.

Other features and advantages of the present invention will, of course, become apparent and immediately suggest themselves to those skilled in the art to which the invention is directed from a reading of the following specification in connection with the accompanying drawing in which:

FIGS. 3a–3h are time diagrams for explaining the operation of the motor circuits of FIGS. 1 and 2;

Figure 1:
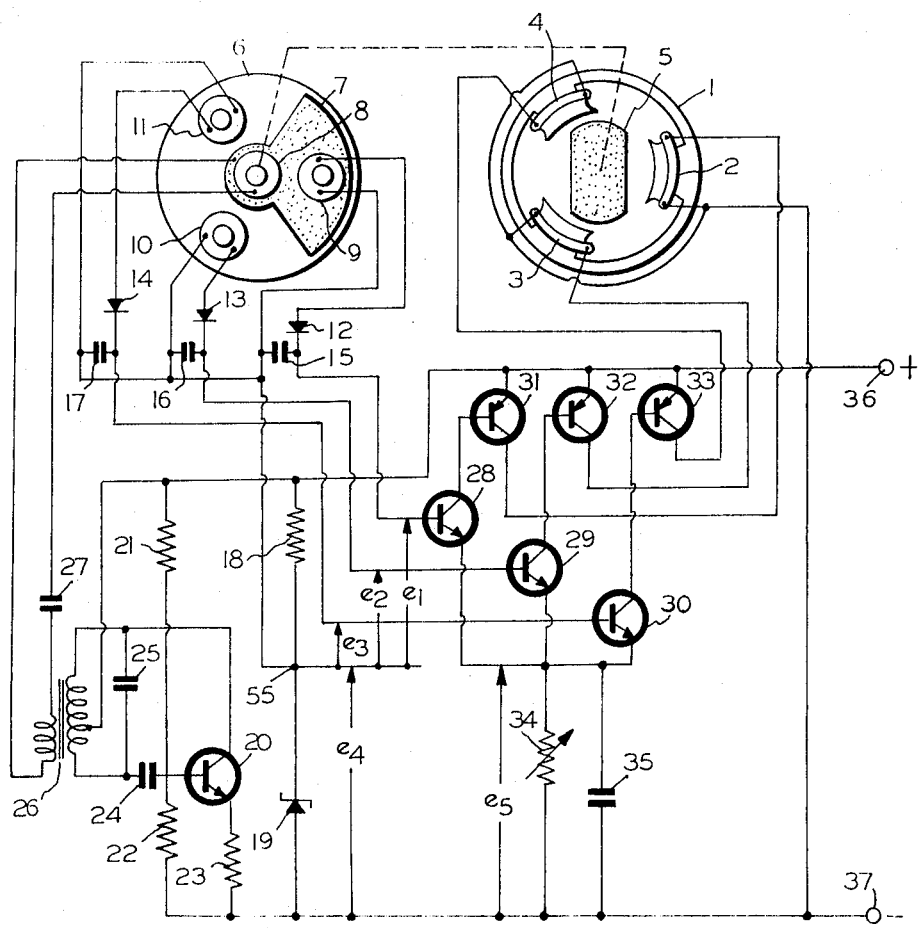
FIG. 1 is a schematic circuit diagram of an electric motor apparatus according to the present invention.

In the embodiment shown in FIG. 1, a stator 1 has three stator windings 2, 3 and 4 wound thereon.

A rotor 5 is rotatably positioned within stator 1. A position detecting means 6 is provided which comprises a position detecting rotor 7 on the shaft of rotor 5, a primary winding 8, and three secondary windings 9, 10 and 11 equidistantly spaced around the detecting means 6. The primary winding 8 is arranged in the center of the position detecting means 6 and always faces the position detecting rotor 7. Each of the secondary windings 9, 10 and 11 faces the position detecting rotor after it has moved 120° from the preceding winding.

A transistor 20, resistors 21, 22 and 23, capacitors 24 and 25, and an oscillator coil 26 are connected in an oscillator circuit which generates a comparatively high frequency (100 Hz–100 KHz) AC signal.

The output signal of the oscillator circuit is fed to said primary winding 8 through a capacitor 27.

Diodes 12, 13 and 14 are connected forwardly, with respect to current flow from the secondary windings, between the one ends of the respective secondary windings and the respective bases of transistors 28, 29 and 30. Each of the other ends of the secondary windings 9, 10 and 11 are connected to one another and connected to a point at which a resistor 18 and a Zener diode 19 are connected to each other, said point hereinafter being designated as pedestal point 55. Resistor 18 and Zener diode 19 are connected in series across power supply lines from terminals 36 and 37.

Capacitors 15, 16 and 17 are connected between the bases of the transistors 28, 29 and 30 and the other ends of said secondary windings, respectively.

The emitters of the transistors 28, 29 and 30 are connected to one another. A resistor 34 and a capacitor 35 are connected in parallel between a power supplying terminal 37 and said commonly connected emitters of transistors 28, 29 and 30.

The bases of transistors 31, 32 and 33 are connected to the collectors of the transistors 28, 29 and 30, respectively.

The emitters of the transistors 31, 32 and 33 are each connected to the other power supplying terminal 36.

The collectors of the transistors 31, 32 and 33 are connected to one end of said stator windings 2, 3 and 4, respectively and each of the other ends of said stator windings 2, 3 and 4 is connected to the power supplying terminal 37.

Transistors 28, 29 and 30 have a polarity opposite to that of transistors 31, 32 and 33; i.e., if transistors 31, 32 and 33 are PNP type transistors, transistors 28, 29 and 30 are NPN type transistors and vice versa. Said oscillator circuit is energized by the current fed from the power supplying terminals 36 and 37.

In operation, the output signal of said oscillator circuit is fed through the capacitor 27 to the primary winding 8. A flux induced in position detecting rotor 7 by the primary winding 8 induces a voltage in the secondary windings 9, 10 and 11 in sequence during rotation of the rotor 7.

Each of the voltages appearing at the ends of the respective secondary windings has a frequency which is the same as the frequency of the output signal of the oscillator circuit, and has an amplitude varying according to the rotational angle of position detecting rotor 7. It will be understood that the position detecting rotor 7 modulates the amplitude of said voltage. The modulated signal is shown in FIGS. 3a–3c. In FIGS. 3a, 3b and 3c, curves 45, 46 and 47 show the envelopes of the output signal of the respective secondary windings. These curves show that said output signals are not greatly modulated, and the envelopes form a three phase curve family.

Diodes 12, 13 and 14 rectify said output signals from the secondary windings 9, 10 and 11, and capacitors 15, 16 and 17 filter out the carrier frequency, i.e. the frequency generated by the oscillator circuit. The voltages appearing between the pedestal point 55 and the output side (cathode in this case) of the respective diodes, are designated $e_1$, $e_2$ and $e_3$ and are shown in FIG. 3d as curves 48, 49 and 50. The voltage appearing between the pedestal point 55 and the power supplying terminal 37 is indicated as being $e_4$ in FIG. 1.

The resistor 18 is given a resistance such that the current flowing through it is comparatively large compared to the base current of transistors 28, 29 and 30.

The voltage of the Zener diode 19 is chosen so that the voltage appearing between the emitters of transistors 28, 29 and 30 and power supplying terminal 37 (shown as $e_5$ in FIG. 1) is large compared to the base to emitter forward voltages of transistors 28, 29 and 30. The diodes 12, 13 and 14 have an output impedance which is low compared to the base circuit impedance of said transistors 28, 29 and 30.

The output signal of the secondary windings 9, 10 and 11 are determined by the value of the peak to valley voltage difference of the voltages $e_1$, $e_2$ and $e_3$. When said peak to valley voltage difference is from about 0.5 to several volts, the transistors 28, 29 and 30 and resistor 34 act as a triple differential switching circuit.

The voltage $e_5$, appearing between the common emitter circuit of said transistors 28, 29 and 30 and the power supplying terminal 37, corresponds to the greatest voltage of the combined voltages $e_1 + e_4$, $e_2 + e_4$ and $e_3 + e_4$. For example, the position of the position detecting rotor 7 shown in FIG. 1 is such that $e_1 + e_4$ is the greatest of the three combined voltages.

The transistor to which the highest base emitter voltage is applied, in this instance transistor 28, feeds its emitter current to the resistor 34 and the voltage $e_5$ is nearly equal to $e_1 + e_4 - 0.6$ volts (when the transistors 28, 29 and 30 are silicon transistors). This state is designated as the ON state of the transistor 28. On the other hand, the base-emitter voltages of the transistors 29 and 30 are very low and the base current and the collector current can not flow. This state is designated as the OFF state of transistors 29 and 30.

The collector current of transistor 28, which is in the ON state, is supplied to the base of transistor 31, which then is turned to the ON state to supply collector current to the stator winding 2.

The current flowing through the stator winding 2 generates a torque in cooperation with permanent magnetized rotor 5. The rotation of the rotor 5, and consequently the rotation of the position detecting rotor 7, varies the voltages $e_1$, $e_2$ and $e_3$. If it is assumed that the torque generated by the current flowing through the stator windings 2 and the rotor 5 has a clockwise direction, then when the rotor 5 rotates about 60° from the position shown in FIG. 1, the output signals of the secondary windings 9 and 10 have equal amplitudes and the voltages $e_1$ and $e_2$ become equal in value and the emitter current of transistor 28 is decreased and the emitter current of transistor 29 is increased.

At this point the two transistors 28 and 39 are in the same state, and both of them feed their emitter current to the resistor 34. With further rotation of rotor 5, the emitter current of transistor 28 decreases further and the emitter current of transistor 29 increases further. The sum of the emitter currents of transistors 28 and 29 is determined by the emitter voltage $e_5$ and the resistance value of resistor 34. As the voltage $e_5$ follows to the base potential of transistors 28 and 29, it remains almost constant, as shown in FIG. 3e as curve 51. When the emitter current of each of transistors 28 and 29 has the same value, which is nearly equal to one half of the emitter current of a single transistor when it is in the ON state, this state is called the transitional state of transistors 28 and 29.

In the vicinity of the transitional state, the two transistors act as a differential amplifier. But the maximum voltage difference of the two secondary windings 9 and 10, i.e., the maximum difference of the input signal to the differential amplifying transistors 28 and 29, is predetermined so as to be sufficiently large to overcome the differential operation and to drive one of the two transistors into the ON state and the other into the OFF state. Thus the two transistors operate as a differential amplifier only for a very small rotational angle of the rotor 7. Therefore, transistors 28 and 29 switch from an ON to an OFF state and vice versa almost instantaneously.

The change of the states of the transistors 29 and 30 and 30 and 28 follow the same pattern as that for the transistors 28 and 29. The ON state of each of the transistors 28, 29 and 30 continues for about 120° of the rotation of the rotor 5. Therefore the rotor 5 generates torque in one direction all during its rotation. The collector currents of the transistors 28, 29 and 30 are shown in FIGS. 3f–3h as curves 52, 53 and 54. Capacitor 35 eliminates undesirable parasitic oscillation.

The switching system described herein is the fundamental principle of this invention. The position detecting device illustrated and described is one which employs an impedance-type commutator utilizing mutual coupling of two coils. But the switching system is applicable to almost all position detecting devices. A gradually varying commutating signal is converted to a commutating current having no overlap and no dead zones by a polyphase rectification gate circuit. As the motor embodying the present invention has no dead zones and no overalp, even if the temperature varies, and even if the supply voltage to the power supply terminal varies, perfect starting of rotation is guaranteed and very smooth torque is obtained.

The smoothness of the torque causes good transformation of current to torque and high efficiency is obtained.

There are many cases in which it is necessary to control the torque generated by the rotor. Controlling of the torque generated by a DC motor can be carried out by varying the supply voltage. However, it is not economical to provide a voltage controlling device between a power supply and the motor.

In the motor described hereinbefore, the generating torque is in proportion to the current flowing through the stator windings 2, 3 and 4. These currents are controlled by the resistor 34, since the current flowing through the stator windings 2, 3 and 4 to control the base currents of the transistors 31, 32 and 33 respectively, which are almost the same as the current flowing through the resistor 34. As the pedestal voltage $e_4$ is large compared to the forward direction base emitter voltage of the transistors (about 0.6 V for silicon transistors), the transistors 28, 29 and 30 operate as almost a constant current circuit when they are in an ON state, the current of which is controlled by the resistor 34.

Figure 4:
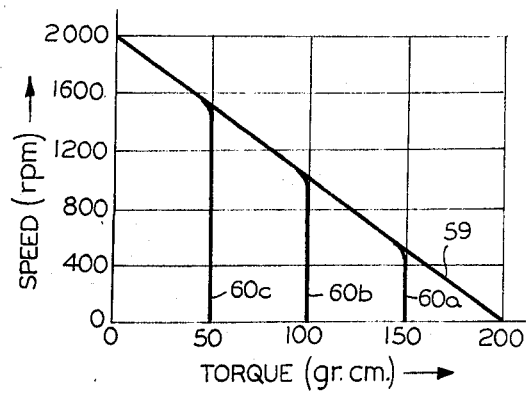
FIG. 4 is a graph illustrating curves of speed vs. torque characteristics of a DC motor having a circuit according to the present invention.

Therefore, the current flowing through the stator windings is almost constant during the time current flows. Constant current in the stator windings produces a constant torque. Therefore an almost constant torque motor can be obtained as shown in FIG. 4. When a sufficiently large base current is supplied to the transistors 31, 32 and 33 these transistors are completely saturated even in the locked state, whereby the conventional characteristic of a shunt motor is obtained, which is illustrated by curve 59 in FIG. 4. For lesser base currents, as governed by and almost equal to the current of resistor 34, the maximum value of the torque decreases, as indicated by curve 60a in FIG. 4. The less the current flowing through the resistor 34, which is determined by the voltages $e_1$, $e_2$, $e_3$ and $e_4$ indicated in FIG. 1 and the resistance value of resistor 34. These voltages are almost independent of the power supply voltage.

In FIG. 1 the resistor 34 is designated as a variable resistor. The current flowing through the resistor 34 is $1/\beta$ of the currents flowing through the stator windings 2, 3 and 4 where $\beta$ is the current amplification factor of the transistors 31, 32 and 33. Therefore the power dissipation in the resistor 34 is very small compared to the input power to the stator windings, and a conventional variable resistor can be used as the resistor 34.

Any other variable resistance means, such as a CdS photoresistive cell for example, and any current controlling device can be substituted for the resistor 34.

A most conventional and most effective device is a transistor. When the resistor 34 is replaced by a transistor, the generated torque is controlled by the electric current to the base of the transistor. This indicates that the motor is able to be used in an electric servo mechanism without using any power amplifier.

The most prominent feature of the motor according to the invention is that the current flows continuously in successive stator windings and the generated torque is very smooth even when the generated torque is small compared to the full starting torque.

Figure 2:
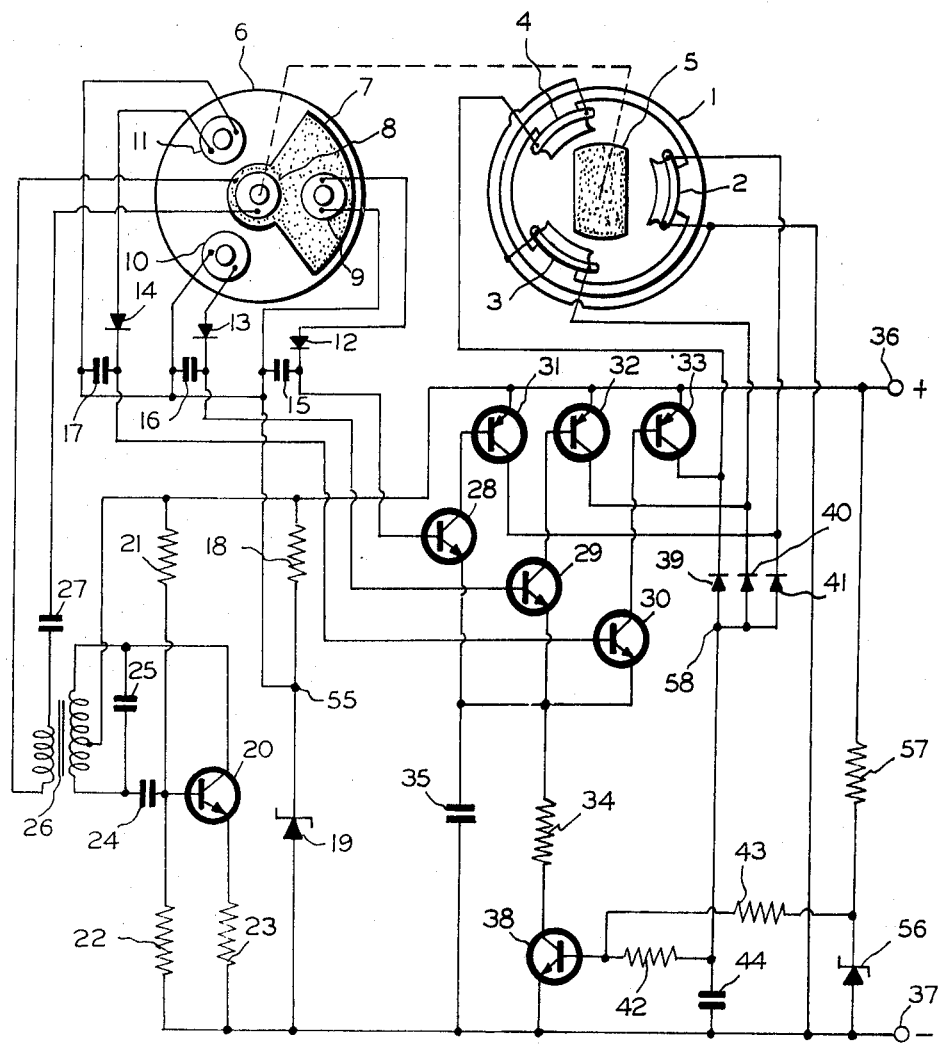
FIG. 2 is a schematic diagram of another electric motor apparatus according to the present invention.

FIG. 2 shows an embodiment of a speed controlled motor which is an example of the application of controlling the generated torque by means of an electric signal.

The collector to emitter path of a transistor 38 is connected in series to the resistor 34. The one electrodes of diodes 39, 40 and 41 are respectively connected to the one end of the stator windings 2, 3 and 4 to which the collectors of the transistors 31, 32 and 33 are respectively connected, in a blocking direction with respect to the collector currents of the transistors 31, 32 and 33. The other electrodes of the diodes 39, 40 and 41 are connected together at a point 58. A resistor 42 is connected between the base of the transistor 38 and the point 58.

A capacitor 44 is connected between the point 58 and the power supply terminal 37. A resistor 57 and a Zener diode 56 are connected in series and connected across the power supply terminals 36 and 37. A resistor 43 is connected between the base of the transistor 38 and the junction point of resistor 57 and the Zener diode 56.

Figure 6A:
FIGS. 6a–6d are time diagrams for explaining the operation of the motor circuit of FIG. 2.
Figure 6B:
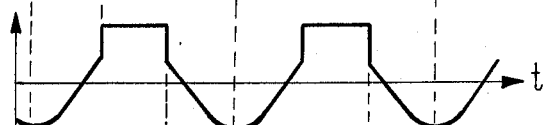
Figure 6C:
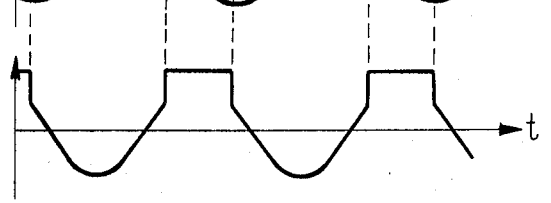
Figure 6D:
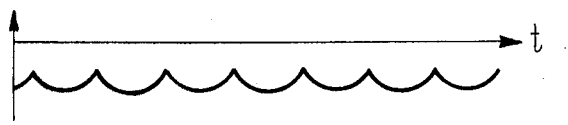

In operation, the emitter currents of the transistors 28, 29 and 30 are controlled by the base current of the transistor 38. The collector voltage wave forms of the transistors 31, 32 and 33 are shown in FIGS. 6a–6c. Diodes 39, 40 and 41 rectify the reverse voltage and a DC voltage containing a ripple voltage is obtained at the point 58, and is shown in FIG. 6d. This voltage is smoothed by the capacitor 44, and there is obtained a DC voltage, which is in proportion to the rotational speed of the rotor 5. The zener diode 56 provides a reference voltage at the junction point of the resistor 57 and the Zener diode 56. The base voltage of the transistor 38 varies according to the ratio of the resistance values of resistors 42 and 43 and the ratio of the voltages of the speed controlling voltage appearing at the point 58 and the reference voltage of Zener diode 56. The base current of the transistor 38 varies greatly when its base voltage is about 0.5–0.7V.

The resistors 43 and 42 are given values so that the ratio of their resistances is nearly equal to the ratio of the reference voltage and the voltage of the point 58 corresponding to the predetermined speed.

Then, if the speed of the rotor 5 exceeds the predetermined speed, the base voltage of the transistor 38 decreases, causing a decrease in the base current of the transistors 31, 32 and 33, and the generated torque is decreased. The decrease of the generated torque results in a decrease of the speed of the rotor 5. When the speed of rotor 5 decreases below the predetermined speed, the base current of the transistor 38 increases causing an increase of the base currents of the transistors 31, 32 and 33, and the generated torque is increased. The increase of the generated torque increases the speed of the rotor 5. Therefore, the speed of the rotor 5 is regulated so as to have an almost constant speed of a predetermined value.

Figure 5:
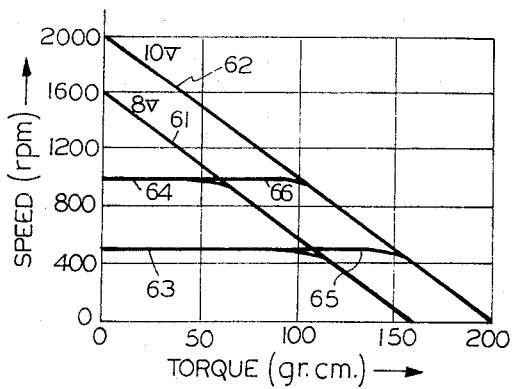
FIG. 5 is a graph illustrating curves of the speed vs. torque characteristics of a DC motor having a circuit according to the present invention.

In FIG. 5, curves 61 and 62 illustrate the characteristics of the case when the collector to emitter path of the transistor 38 is shorted by a conductor. Curves 63, 64, 65 and 66 illustrate the characteristics of the case when the transistor 38 operates and the speed of the rotor is regulated at some predetermined value. To give a predetermined speed to the rotor it is only necessary to provide the proper resistor 42 or resistor 43 or a Zener diode 56 of the proper voltage.

The speed of the rotor is thus almost independent of any variation in the power supply voltage.

We claim:

1. An electric motor apparatus comprising stator windings mounted for generating magnetic fields in selected areas; a permanently magnetized rotor movably mounted adjacent said stator windings for rotation within said magnetic fields; a position detecting means coupled to said rotor for detecting the relative rotational position of said stator windings and said rotor, said position detecting means including voltage generating means for generating a family of voltages having values varying according to said rotational position; a current control circuit comprising a control terminal and a current path; a plurality of transistors, the emitter of each of said transistors being coupled to the current path of said current control circuit; means for generating a pedestal voltage to which said voltage generating means is coupled for adding said pedestal voltage to each of said family of voltages, the output of said pedestal voltage generating means being coupled with the bases of said transistors and the current path of said current control circuit for supplying the voltage generated by said position detecting means across the bases of said transistors and the current path of said current control circuit; means coupling the collectors of said transistors to the respective stator windings; means for detecting the rotational speed of said rotor generating a signal corresponding to the speed; means for generating a reference signal to provide a signal corresponding to the predetermined speed; and means for comparing said signal corresponding to the speed and said reference signal and obtaining a signal to control said control circuit and coupled to said terminal of said current control circuit.

2. An electric motor apparatus comprising:

three sets of stator windings mounted for generating magnetic fields in selected areas;

a permanently magnetized rotor movably mounted adjacent said stator windings for rotation within said magnetic fields;

a position detecting means having a position detecting rotor coupled with said permanently magnetized rotor and rotatable therewith, and position detecting stator means positioned around said position detecting rotor, said position detecting stator means generating three sets of gradually varying position signals in cooperation with the position detecting rotor during rotation thereof, said position signal indicating the relation of the relative rotational position of said stator windings and said rotor and being gradually varying signals which have a poor on-off ratio;

a pedestal voltage generating means to which said position detecting means is coupled for providing a direct current bias voltage to the position signals;

an impedance means having two terminals and the impedance of which is variable in response to an external command;

three transistors, the emitter of each of said transistors being coupled to one terminal of said impedance means, said position detecting means being coupled to the bases of said transistors and to the pedestal voltage generating means for supplying the signals generated by said position detecting means and the pedestal voltage means across the bases of said transistors and the other terminal of said impedance means; and means coupling the collectors of said transistors to the respective stator windings.

3. An electric motor apparatus as claimed in claim 2, in which said impedance means is a variable resistor.

4. An electric motor apparatus as claimed in claim 2, in which said impedance means is a variable impedance means responsive to a physical value.

5. An electric motor apparatus as claimed in claim 2, in which said impedance means is a resistor and a transistor.

* * * * *